United States Patent [19]
Miller et al.

[11] 3,807,389
[45] Apr. 30, 1974

[54] MEDICAL INSTRUMENT FOR MEASURING FLUID PRESSURE

[76] Inventors: William Miller, 25 Manitou Rd., Westport, Conn.; Martin F. Sturman, 12460 N. Bay Shore Dr., Miami, Fla. 33161; Maurice S. Kanbar, 4 E. 77th St., New York, N.Y.

[22] Filed: Dec. 29, 1971

[21] Appl. No.: 213,463

[52] U.S. Cl............................................. 128/2.05 D
[51] Int. Cl................................................ A61b 5/02
[58] Field of Search.................. 128/2.05 D; 73/402

[56] References Cited
UNITED STATES PATENTS

| | | | |
|---|---|---|---|
| 3,690,312 | 9/1972 | Leibinsohn | 128/2.05 D |
| 3,157,201 | 11/1964 | Littmann | 128/2.05 D UX |
| 3,526,218 | 9/1970 | Reiss | 128/2.05 D X |
| 3,242,920 | 3/1966 | Andersen | 128/2.05 D |
| 3,062,202 | 11/1962 | Hyman et al. | 128/2.05 D |
| 3,183,722 | 5/1965 | Unger et al. | 128/2.05 D |
| 2,600,324 | 6/1952 | Rappaport | 128/2.05 D X |
| 3,561,431 | 2/1971 | Pannier, Jr. | 128/2.05 D |

*Primary Examiner*—Kyle L. Howell

[57] ABSTRACT

A medical instrument for measuring fluid pressure interposable in any of a variety of intravascular infusion apparatus. The instrument includes a body having a through passage, a closed chamber and capillary tube forming a pressure gauge, a valve chamber including a vent and a valve member in the valve chamber. With one end of the through passage connected to the patient and the other end of the through passage connected to a source of fluid the valve member may be manipulated to permit infusion of the fluid, to block infusion and allow a return flow of fluid from the patient while venting the through passage, capillary tube and closed chamber, and to block infusion and allow a return flow of fluid from the patient into the valve chamber and capillary tube while blocking the vent so that the pressure of the return flow of fluid may be measured.

4 Claims, 6 Drawing Figures

PATENTED APR 30 1974 3,807,389

INVENTORS
WILLIAM MILLER
MARTIN F. STURMAN
BY MAURICE S. KANBAR

MATTERN WARE AND DAVIS
ATTORNEYS

MEDICAL INSTRUMENT FOR MEASURING FLUID PRESSURE

BACKGROUND OF THE INVENTION

This invention relates generally to medical instruments for measuring fluid pressure, and more particularly to a device injected directly into an intravascular passage or interposed in an intravascular infusion pathway for measuring intravascular fluid pressure.

In medical practice, various significant clinical situations and pathological conditions are often accompanied by abnormally elevated central and peripheral venous pressure. In addition to the more or less continuous high venous pressure seen in many cases of congestive heart failure, pericarditis, and vena caval compression or obstruction, there exist several acute and subacute problems associated with changing levels of central and peripheral venous pressure.

It has been demonstrated, for example, that the monitoring of central venous pressure by means of an indwelling catheter in the superior vena cava is extremely useful in assessing circulatory function in such diverse clinical states as left or right ventricular failure occurring in myocardial infarction, pulmonary embolism, and shock due to a variety of causes. Moreover, the level of central venous pressure, hereinafter referred to as C.V.P., as well as its direction and rate of change, is frequently employed as a guide to appropriate therapy in these conditions.

Many patients in shock from sepsis, volume depletion or cardiac failure, can safely receive intravenous fluids at a rate which avoids undue elevation of C.V.P. and peripheral venous pressure. The measurement of venous pressure thus attains equal importance with arterial pressure, blood volume, cardiac output, clinical appearance, and other factors in assessing the status of critically ill patients.

Monitoring of C.V.P. is therefore routinely applied in some centers for the clinical management of the following types of problems: severe trauma, septic shock, severe myocardial infarction, massive pulmonary embolism, post-operative (and even operative) patients undergoing open and closed cardiac and major vascular repair surgery. There is little doubt but that the application of C.V.P. monitoring will hereinafter continue to expand, particularly if techniques for pressure measurment are improved.

Moreover, the intravenous infusion of various types of fluids to an enormous variety of patients is almost a routine hospital procedure. Since many border-line clinical situations occur which ordinarily do not justify the hazards, discomfort, and inconvenience of central venous catheterization, the option of a rapid, simple, safe peripheral venous pressure measurement coincident with any routine intravenous infusion is highly desirable. Although peripheral venous pressure does not always reflect C.V.P., the correlation with the clinical status of a patient during infusion is sufficient in the majority of cases to avoid circulatory overload or conversely to permit more rapid fluid administration.

Currently, the most commonly used technique for measuring peripheral or central venous pressure entails a direct-reading graduated glass or plastic manometer which is connected by means of a three-way stopcock directly to a needle or catheter inserted into an arm vein. The pressure is read directly and is determined by the level to which blood will rise in or displace normal saline solution in the manometer.

Normal venous pressure varies through a relatively wide range — usually between 2 to 10 or even as high as 13 cm. of water. Hence the conventional technique requires a fairly long manometer tube which is cumbersome to handle. Furthermore, the manometer tube and associated apparatus must be carefully assembled and properly supported, and prior to each measurement it must be flushed with a saline solution to remove air trapped therein. Moreover, since the upper end of the manometer is open to the outside air, the fluid can be exposed to bacterial contamination. It is possible for such bacterial contamination to be transmitted to the patient.

A further difficulty with the measurement technique using a long manometer tube is the necessity of accurately adjusting a zero point corresponding to a given point on the patient. Frequent patient motion compounds this problem, and the zero reference point must be constantly re-established by vertical adjustment of the manometer, which procedure often consumes more time than the actual measurement.

One known attempt to provide a simple and compact direct-reading fluid pressure measuring device takes the form of a hypodermic needle attached to one end of a capillary tube, the other end of which communicates with an enlarged bulb or air reservoir. When the needle is injected into a vein, the ratio of bulb-to-tube volume is such that fluid entering the tube will flow to a point therein, establishing equilibrium between the fluid pressure and the internal air pressure of the tube and associated bulb. The interface between the fluid and air is observable along the capillary tube, and a scale printed adjacent thereto indicates a pressure reading.

One difficulty with an instrument of this known type is that the pressure of the air compressed in the tube and associated bulb is a function of temperature, and because the instrument is designed to be hand held, the temperature level is variable. Therefore, a reading may be grossly low and inaccurate due to heating and consequent expansion of air trapped in the tube and associated bulb. This expansion may also create a dangerous situation by forcing all of the blood back into the patient and thereafter introducing air bubbles into the patient with serious resultant consequences.

Furthermore, this known type of device is inaccurate because it is uncalibrated; i.e., the volume of air trapped in the capillary tube and associated chamber is not constant, and instead varies with the length of the needle or catheter used to connect the instrument to a vein or other intravascular passage. In the case of an indwelling central venous catheter, the length of volume and tubing is very great as compared to a short hypodermic needle, and the pressure measurement varies accordingly. A still further problem exists with this known type of device in that a tourniquet is temporarily applied to a patient's arm for raising a vein prior to insertion of a hypodermic needle, and the pressure within the vein is temporarily elevated as a result of the tourniquet. The instrument would read initially this elevated pressure, and the elevated pressure can cause blood to enter the air bulb. Even if the pressure is permitted to subside before taking a reading, blood remaining in the bulb displaces some of the air thereby disrupting the normal calibration of the instrument.

Also known is a device which comprises a capillary tube and associated close chamber and a three-position valve mounted at the entrance to the capillary tube. The valve selectively interconnects the tube with a source of fluid the pressure of which is to be measured, and an air vent for equalizing pressure between the tube and the atmosphere, which air vent can also be used for removing samples of fluid from the capillary tube. The three-way valve further provides for connecting the source of fluid and the air vent while blocking the entrance of the capillary tube, whereby samples of the fluid can be directly obtained. The device also includes various fin means which increase heat transfer between the ambient and the air enclosed by the capillary tube and associated bulb. This device is operated by first inserting a hollow needle attached thereto into the patient's fluid passage to connect that passage to the three-position valve. The valve is then positioned to block the entrance to the capillary tube and to permit fluid from the patient to flow through the valve. The valve is next positioned to vent the capillary tube and associated air reservoir to atmosphere while blocking further flow of fluid. The fluid passage and capillary tube are then joined by the valve, and a reading of pressure is taken at the point of equilibrium between the fluid and compressed air, which point lies along the capillary tube and is read by means of a scale positioned adjacent thereto.

An alternative embodiment of the above-described valved device incorporates a hypodermic syringe mounted and communicating with one port of the three-way valve, replacing the air vent. An air vent is provided from the bulb. In this embodiment, the fluid from the patient and the syringe are first connected by means of the three-way valve and a source of fluid is collected in the syringe. The three-way valve is then positioned to connect the syringe and the capillary tube, and fluid is pumped from the syringe up the tube to a zero point on the adjacent scale, the air vent being open at this time. Subsequently, the air vent is closed and the three-position valve turned to connect the source of fluid with the tube, and a measurement is thereby achieved.

Although an improvement in the art of medical pressure measurement, the device has several disadvantages. First, the venting of the air chamber is always accomplished while blocking flow of fluid from the fluid passage. When the fluid is subsequently released for measurement of its pressure, a surge of fluid may occur and result in an inaccurate reading. In one embodiment of the invention, the zero point is inaccurately established, because it lies somewhere within the three-way valve structure. In the alternative embodiment a zero point is more accurately established by means of the syringe-pump combination; however, the possibility of an initial surge still exists as the three-way valve is used to temporarily block the connection to the fluid passage.

The device is difficult to manipulate, requiring in all instances rotation and precise positioning of a rotary valve located relatively near to the patient's body. In one embodiment, it is necessary to separately operate a tape valve, which may be prone to leakage unless thoroughly "rubbed shut," which manipulation may cause movement of the device and pain to the patient.

Neither of the prior art devices described above are suitable for continuous monitoring of venous or other pressures by means of intermittent, easily performed measurements. Each requires introduction of a hypodermic needle into the patient for each measurement, or in the alternative leaving the device connected to the patient between measurements. Furthermore, if the user should grasp the instrument by the fins provided around the air bulb, the heat transfer between the user's hand and the air bulb will be excellent, and will produce a noticeable rise in air bulb temperature in less than one minute.

SUMMARY OF THE INVENTION

It is an object of the invention to provide a medical instrument for measuring fluid pressure including peripheral or central venous pressure, spinal fluid pressure, and arterial pressure.

It is another object of this invention to provide a medical instrument for measuring fluid pressure which is accurate.

It is an additional object of the invention to provide a medical instrument for measuring venous pressure which can be used in conjunction with intravenous infusion apparatus.

It is a further object of the invention to provide a medical instrument for measuring fluid pressure which resists heat transfer between the user and the instrument, where such heat transfer would introduce error.

Other objects of the invention will in part be obvious and will in part appear hereinafter.

Generally, the objects of the invention are accomplished in one of two alternative devices. The first comprises a capillary tube associated and communicating with an air chamber. A hypodermic needle, catheter, adapter, or other appropriate tubing is attachable to the other end of the capillary tube to introduce fluid therein. A selectively closable air vent is provided along the capillary tube at the zero point of a scale positioned therealong. Fluid or blood entering the capillary tube under pressure from the patient will flow to the vent, and will pass therethrough without proceeding further up the capillary tube. The air chamber and capillary tube are simultaneously vented through the air vent. When the vent is closed, the fluid or blood will flow further up the capillary tube displacing air from the capillary tube, to a point therein establishing equilibrium with the air pressure of the compressed volume of air in the tube and associated bulb, which is maintained at a substantially constant temperature level. The boundary between the fluid and the air is observable along the tube indicia to provide a measurement which is an accurate index of fluid pressure.

The alternative embodiment also comprises a capillary tube and associated enlarged air chamber which are defined in a housing. The housing further includes a through-passage which may be interposed in the feed line of a fluid infusion apparatus, and a branch of the passage communicates with the mouth of the capillary tube and further extends to a vent. A plunger valve selectively permits flow through the through-passage for intravenous infusion of fluid, stops fluid infusion and permits back flow of fluid past the mouth of the capillary tube and through the vent thereby simultaneously venting the tube and associated air chamber and the fluid, and blocks the vent wherein fluid flows up the capillary tube to a point therein establishing equilibrium with the air pressure of the compressed volume of air in the capillary tube and associated bulb.

The device is held by means of the plunger valve, housing wherein there is little or no heat conductivity between the user and the air chamber. This eliminates the possibility of inaccurate reading because of fluctuating temperature of the compressed air. The simultaneous venting of the capillary tube and associated air chamber and the fluid immediately prior to pressure measurement reduces the possibility of error from an initial surge of fluid up the capillary tube.

Both embodiments are remarkably simple to use, requiring only one hand to operate, and provide accurate pressure measurement. The embodiment providing a through-passage for intravenous infusion encourages frequent pressure measurement, being continuously attached and ready for use.

THE DRAWINGS

For a fuller understanding of the nature and objects of the invention, reference should be had to the following detailed description taken in connection with the accompanying drawing, in which.

The same numbers refer to the same elements throughout the FIGURES.

PREFERRED EMBODIMENTS

Figure 1:
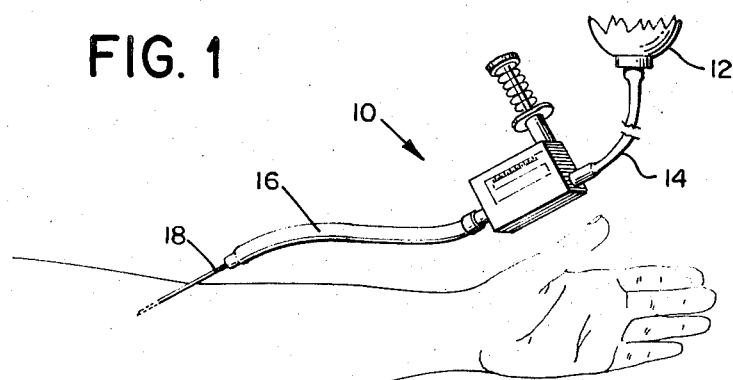
FIG. 1 is a perspective view of a medical instrument according to the invention for measuring fluid pressure.

Referring to FIG. 1, a medical instrument for measuring fluid pressure according to the invention is indicated at 10. The instrument is interposed in an intravenous fluid infusion feeding apparatus generally comprising a bottle 12 containing fluid, a first length of tubing 14 interconnecting the bottle and the fluid pressure measuring device 10, a second length of tubing at 16 connecting the fluid pressure measuring device with a hypodermic needle 18 inserted into a vein in a patient's arm.

Figure 2:
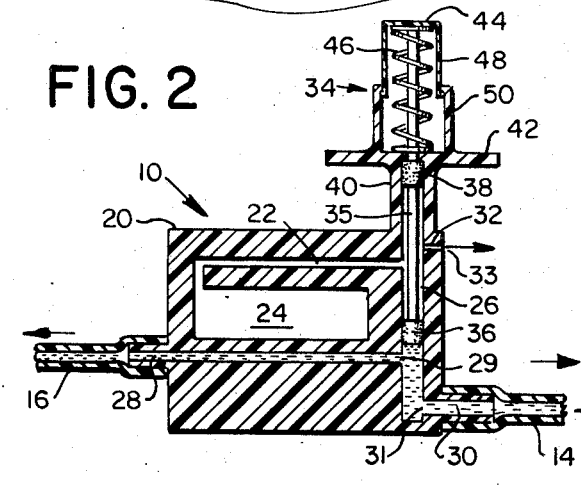
FIG. 2 is a cross-sectional view of the medical instrument of FIG. 1 with the plunger valve in a first position to permit intravenous infusion.

Referring now to FIG. 2, the fluid pressure measuring instrument comprises a housing at 20 having formed therein a tube 22 of capillary dimensions, which tube communicates with a larger air chamber 24. For venous pressure measurements, the ratio of air chamber to capillary tube volume is preferably in the range of 50:1 to 150:1. The mouth of capillary tube 22 opens into a valve chamber passage 26. A stem portion 40 of housing 11 protrudes upwardly whereby valve chamber 26 is elongated with respect to the housing and has its upper end removed from the main portion of the housing. The valve chamber 26 also intersects and communicates with passage 28 at 29 and passage 30 at 31, the ends of which comprise the inlet and outlet of the device 10. The valve chamber 26 is also provided with an air vent 32, and a bacterial filter 33 (not shown), such as manufactured by the Millipore Corporation of Bedford, Mass., is preferably placed in the air vent.

Valve chamber 26 receives in axial alignment a plunger valve 34 having a valve stem 35 with two spaced-apart sealing rings 36 and 38 mounted thereon. Valve stem 34 is smaller than valve chamber 26, having a diameter approximately half thereof, and the two sealing rings 36 and 38 completely seal the valve chamber 26 and are mounted for sliding movement therein on valve stem 35.

Two tabs 42 extend radially outward from housing stem 40. The operator preferably grasps the instrument by placing two fingers under tabs 42, and thereafter conveniently operates the plunger valve 34 by pushing downwardly on a valve stem terminating disc 44. The valve stem 34 and associated sealing rings 36 and 38 are returned automatically to the position shown in FIG. 2 by means of coil spring 46 which is mounted coaxially with valve stem 35 between the valve stem terminating disc 44 and the housing stem 40. The spring 46 is preferably shielded by two concentric telescoping cylindrical sleeves 48 and 50 also mounted coaxially with the valve stem 35 and coil spring 46.

The portions of housing 11 which define the ends of passage 28 and 30 protrude outwardly from the housing to receive tubes 14 and 16 in telescoping engagement. The tube 14 interconnects a fluid supply 12 with the passage 30, and tube 16 connects passage 28 with the hypodermic needle 18, as shown in FIGS. 1 and 2.

With the valve in its relaxed position shown in FIG. 2, a through-passage permitting a flow of fluid through the fluid pressure measuring device 10 exists. The through-passage is comprised of a passage 30, the lower portion of valve chamber 26, and passage 28. Thus, the fluid pressure measuring device can be installed in an intravenous infusion apparatus as shown in FIG. 1 and cause a normal fluid flow to the patient. The capillary tube 22 and associated air chamber 24 are vented to atmospheric pressure through vent 32 during normal fluid flow.

When it is desired to make a fluid pressure measurement, the user grasps the device by means of tabs 42, and positions the device on a level with the patient to avoid errors in pressure measurement due to a pressure "head" in tube 16. Because the user handles the device 10 by means of tabs 42 and plunger valve 34, which are well removed from air chamber 24, there is little if any heat transfer from the user to the device, particularly during the short time required to make a pressure measurement.

Figure 3:
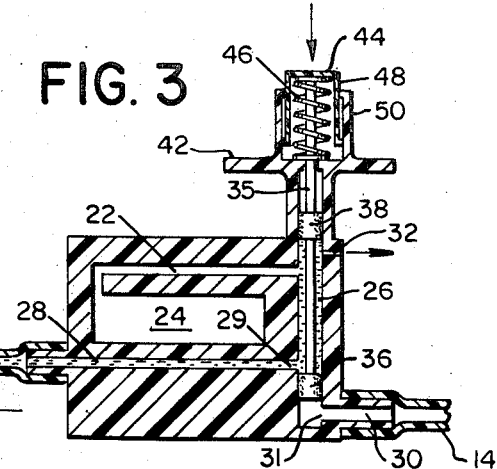
FIG. 3 is a cross-sectional view similar to FIG. 2 with the valve in a second position simultaneously venting the capillary tube and associated chamber and the fluid the pressure of which is to be measured.

The user next partially depresses plunger valve 34 to the position shown in FIG. 3. The lower sealing ring 36 is thereby moved downward to isolate passage 30 from passage 28, and a return pressurized flow of fluid from the patient fills the portion of valve chambers 26 between the two sealing rings. This portion of the valve chamber is intersected by the capillary tube 22, and is also intersected by air vent 32. The fluid which fills the valve chamber 26 between the two sealing rings escapes through the air vent, and does not flow into the capillary tube. Any expansion of air in the capillary tube and air chamber is also readily accommodated in the valve chamber 26 and the capillary tube and air chamber are thus vented to the atmosphere simultaneously with the fluid flowing from the patient through fluid passage 28.

Figure 4:
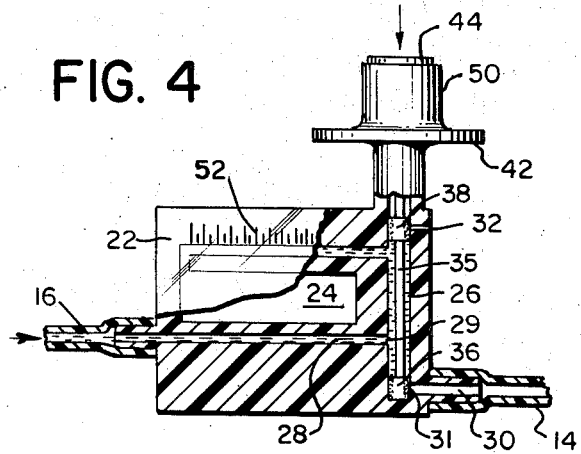
FIG. 4 is a partially cross-sectional view similar to FIG. 3 with the valve in a third position blocking the air bent and causing a pressure measurement to occur.

When the fluid has reached the position described above and shown in FIG. 3, a pressure measurement is initiated by completely depressing the plunger valve 35 to the position shown in FIG. 4. This causes the upper sealing ring 38 to block the air vent 32, while the lower sealing ring 36 continues to block the passage 30. The venous pressure of the patient causes the fluid to flow up the capillary tube 22, thereby compressing the air contained in the capillary tube and associated air chamber 24. When an equilibrium is reached between the fluid and the compressed air, the fluid pressure is read by noting the position of the fluid-air boundary along a scale 50 located adjacent to the capillary tube 22.

It is difficult to read the position of the fluid-air boundary if a transparent feeding fluid is used. This difficulty can be obviated by painting a fine red line directly behind the capillary tube. When there is no fluid in the capillary tube, the air in the capillary acts as a cylindrical air lens, and the red line is not visible. When fluid enters the capillary tube the fluid and capillary together comprise a transparent medium, and the red line becomes visible behind the fluid up to the fluid-air boundary.

Subsequent to measuring and reading the fluid pressure, the user releases the plunger valve 34 and spring 46 causes it to return to the position shown in FIG. 2. At this time normal intravenous infusion resumes, with the device instantly available for subsequent pressure measurement. Each reading requires only a brief interruption in the intravenous fluid infusion, and thereby encourages regular monitoring of venous pressure.

In those cases in which the clinical state of the patient is such that the disadvantages of a C.V.P. catheter are deemed justified, the apparatus described above may remain in situ with the distal conventional in-dwelling needle being replaced by a central venous catheter. The device 10 is then connected to the central venous catheter by means of tubing communicating with passage 28, and central venous pressure is now monitored in the manner described above.

The device 10 described above may be made primarily of low cost plastic, and is sufficiently inexpensive to be disposed of after use on one patient.

Figure 5:
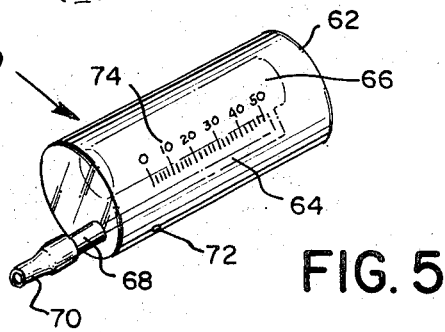
FIG. 5 is a perspective view of a second medical instrument according to the invention for measuring fluid pressure.

Referring now to FIG. 5, a second fluid pressure measuring device 60 which comprises a second embodiment of the invention is shown. The fluid pressure measuring device 60 comprises a cylindrical housing 62 having formed therein a capillary tube 64 communicating with an air chamber 66 which is also formed within the housing. A protruding cylindrical portion 68 of the housing extends outwardly for receiving in telescoping engagement a hypodermic needle 70, thereby providing a fluid passage from the tip of the hypodermic needle into the capillary tube. A tube leading to a hypodermic needle may also be received over protrusion 68. A passage 72 intersects the capillary tube to form an air vent, the operation of which will be described below. A scale 74 is printed on the housing adjacent to the capillary tube 64, with the "zero" end of the scale aligned with the intersection of the air vent 72 with the capillary tube.

In the case of venous pressure measurements, the ratio of air chamber to capillary tube volume is preferably in the range of 50:1 to 150:1.

Measurement of venous pressure is accomplished by first applying a tourniquet to raise or distend one of the patient's veins, and the hypodermic needle 70 is then inserted therein. It is necessary to apply the tourniquet in order to achieve a venipuncture. However, the arm tourniquet temporarily increases the venous pressure to a considerable degree, which causes a surge of fluid up the hypodermic needles into the portion of the capillary tube below air vent 72.

Thus surge of fluid, if unvented, would result in a grossly inaccurate pressure reading. The inrushing of blood could fill the entire capillary tube and spill over into the air chamber, thereby making further reading difficult even after the pressure subsequently subsided, as the blood would normally not return from the air chamber into the relatively restricted capillary tube. Any blood remaining in the air chamber would disrupt the fixed volume thereof.

The air vent 72 bleeds off the initial surge, preventing the above-described difficulty. The vent is allowed to remain open until the arm tourniquet has been removed and the venous pressure has subsided to its normal level. It should be noted that while the excessively high venous pressure is being vented, the air chamber and the capillary tube are also simultaneously being vented to atmosphere. Because of the simultaneous venting of the blood and the chamber and capillary tube, it is unnecessary to provide means for thermally insulating the device against heat transfer from the user, as the expansion of the air is vented off immediately prior to reading.

Figure 6:
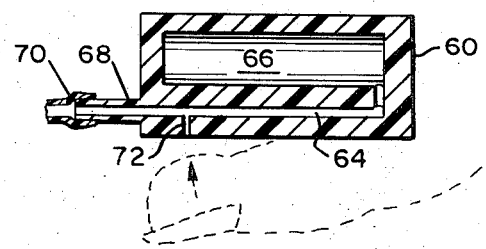
FIG. 6 is a cross-sectional view of the medical instrument of FIG. 5.

When the venous pressure has subsided subsequent to removing the arm tourniquet, the user initiates a pressure measurement by blocking the air vent by any suitable means, such as his finger as is shown in FIG. 6. The venous pressurized blood then compresses the air in the capillary tube and associated air chamber until an equilibrium is reached, at which time the user may read the pressure by noting the position of the fluid-air interface in relation to the scale 74. Although the temperature of the air trapped in the chamber and capillary tube may rise due to heat transfer between the user and the device, the pressure measurement is accomplished in a very brief period of time during which the pressure change due to thermal effects is so small as to be negligible.

After a pressure measurement has been obtained, the device is removed from the patient and discarded. This embodiment of the invention may also be inexpensively fabricated of plastic, and comprises an extremely uncomplicated device, free from valves or the like, capable of accurate, quick venous pressure measurement.

The basic scientific principle used in the medical instrument for measuring fluid pressure described herein is Boyle's Law, which states that for a given mass of gas at a constant temperature, the product of pressure and volume is a constant. The law is commonly written as $PV=nRT$, where $P$=pressure of the gas, $V$=volume of the gas and $n$=the number of moles of the gas, $R$=a gas constant, and $T$= the temperature of the gas. Ordinary air at normal atmospheric pressures and temperatures behaves like an ideal gas and therefore closely follows Boyle's Law.

In the devices described above the capillary tube and air chamber contain an accurately known volume of air at ambient temperature and atmospheric pressure. This volume of air is exposed to and compressed by venous pressure.

If the symbols $P_0$ and $V_0$ represent respectively atmospheric pressure and the volume of the capillary tube and associated air chamber in the devices before being subjected to venous pressure, and if the corresponding values after venous pressure is applied are designated by $P_0 + \Delta P$ and $V_0 + \Delta V$, then assuming a constant temperature, $(P_0 + \Delta P) \cdot (V_0 + \Delta V) = P_0 \cdot V_0$. This equation reduces to: $P_0 \cdot \Delta V + V_0 \cdot \Delta P + \Delta P \cdot \Delta V = 0$.

Venous pressures are typically about 10 cm. $H_2O$ above atmospheric pressure. Since atmospheric pressure is itself about 1,000 cm. $H_2O$ (i.e., about 76 cm. Hg), venous pressure is about 1 percent above atmospheric. Thus, for typical venous pressure encountered in practice, $\Delta P$ will be a very small fraction of $P_0$, and $\Delta V$ will also be small relative to $V_0$, with the result that the term $\Delta P \cdot \Delta V$ in the last equation above may be dropped. This immediately leads to the following result:

$$P_0 \cdot \Delta V = -V_0 \cdot \Delta P,$$

or $$\Delta P = -\Delta V \cdot P_0 / V_0$$

The venous pressure is directly proportional to the decrease in the volume of air trapped within the capillary tube and associated air chamber in both of the above devices. The original volume of air trapped in the capillary tube and air chamber has its boundary respectively at the lower end of the capillary tube 22 in the device 10 and at the air vent 72 in device 60, and the movement of fluid along the capillary tube is directly proportional to the increase in fluid pressure causing this movement in both devices.

A chamber which terminates in a callibrated capillary tube which as used herein for fluid pressure measurement is almost identical, in form, to pycnometers, which are fixed volume devices that are commonly used to measure densities of fluids. The above equations are well known in the art relating to pressure measurement, and the medical instruments for measuring fluid pressure described herein are special adaptations of pycnometers.

Although the description of the preferred embodiments of the invention herein relates primarily to devices particularly well adapted for measuring venous pressure, it will be apparent to one skilled in the art that the devices may easily be adapted for measuring other clinical pressures, such as spinal fluid pressure, arterial pressure, and various other body conduit or organ flow measurements.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A medical instrument useable in conjunction with an intravascular infusion system having a fluid source and adapted selectively to effect normal intravascular infusion or to measure intravascular fluid pressure; said instrument comprising:

A. an instrument body having formed therein a through-passage, one end of which includes means connectable to said fluid source and the other end of which includes means connectable to a patient to provide a feed path for the infusion system, a closed air cavity, a capillary tube, one end of which communicates with the cavity to define therewith a pressure gauge means, a valve chamber defining a conduit extending between said through-passage and the other end of said capillary tube, and an air vent connecting said chamber to the atmosphere, and B. valve means movable within said valve chamber from a first position blocking flow between said through-passage and said valve chamber to permit normal infusion, to a second position blocking flow between said fluid source and said through-passage to interrupt infusion and to admit a return flow of pressurized fluid from the patient into said valve chamber without blocking said vent, to a third position blocking flow between said fluid source and said through-passage to interrupt infusion and to admit a return flow of pressurized fluid from the patient into said valve chamber while blocking said vent, thereby causing the pressurized fluid to flow into said capillary tube to be measured by said gauge.

2. A medical instrument as described in claim 1, and further comprising:

F. a scale on said body positioned adjacent to the capillary tube with the zero point of said scale coinciding with the open end of the capillary tube.

3. A medical instrument as defined in claim 1 and further comprising:

F. means for automatically returning said valve from its third position to its first position.

4. A medical instrument as defined in claim 1 wherein the valve means further comprises valve manipulating means adapted for holding the instrument, the valve manipulating means positioned away from said body to avoid heat transfer from the operator's hand to the air contained therein.

* * * * *